Aug. 20, 1940.                C. C. FARMER                    2,211,916
                            BRAKE MECHANISM
                        Filed April 29, 1939          2 Sheets-Sheet 1
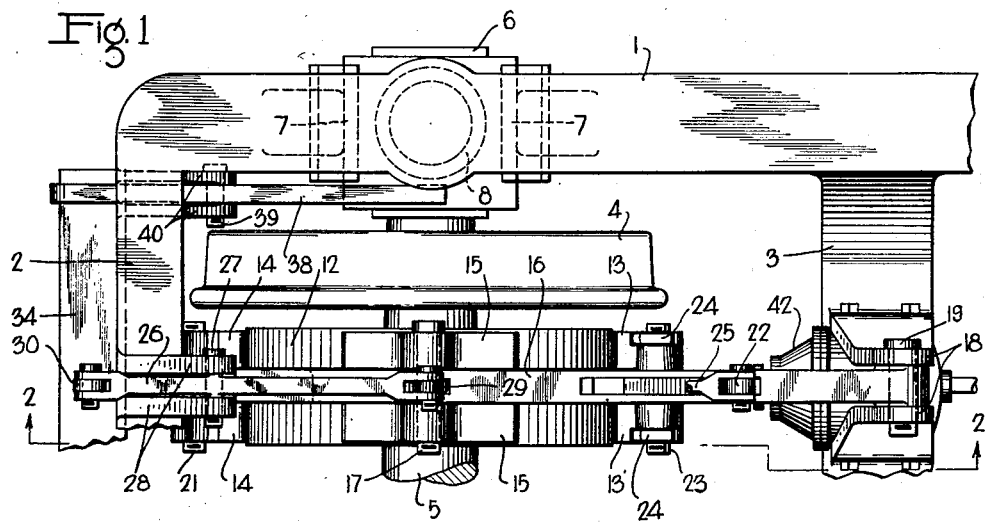
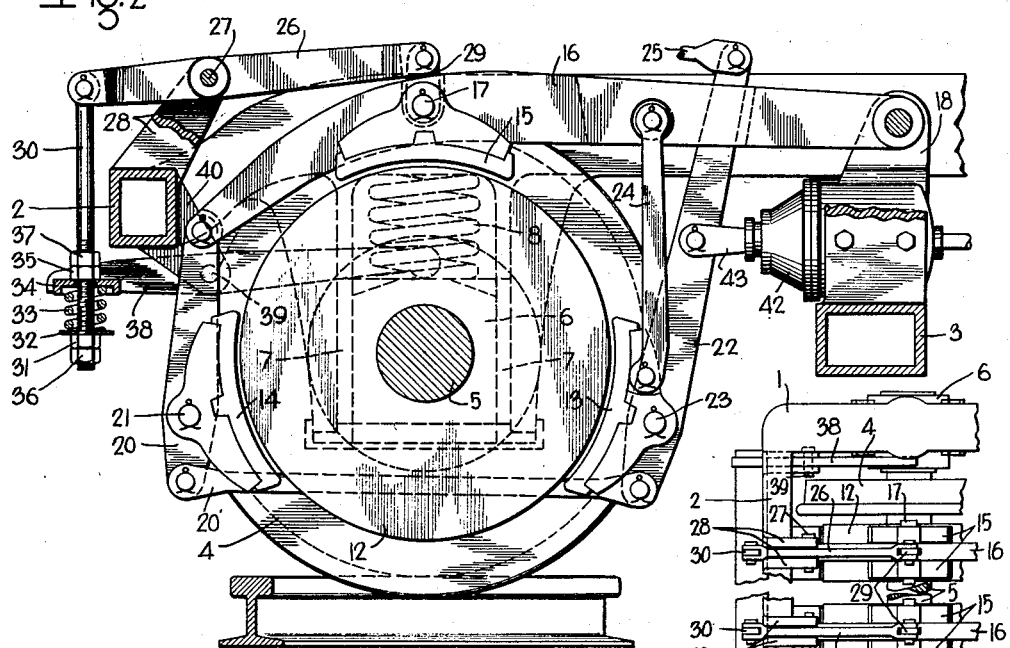
INVENTOR
CLYDE C. FARMER.
BY
ATTORNEY Aug. 20, 1940.   C. C. FARMER   2,211,916
BRAKE MECHANISM
Filed April 29, 1939   2 Sheets-Sheet 2
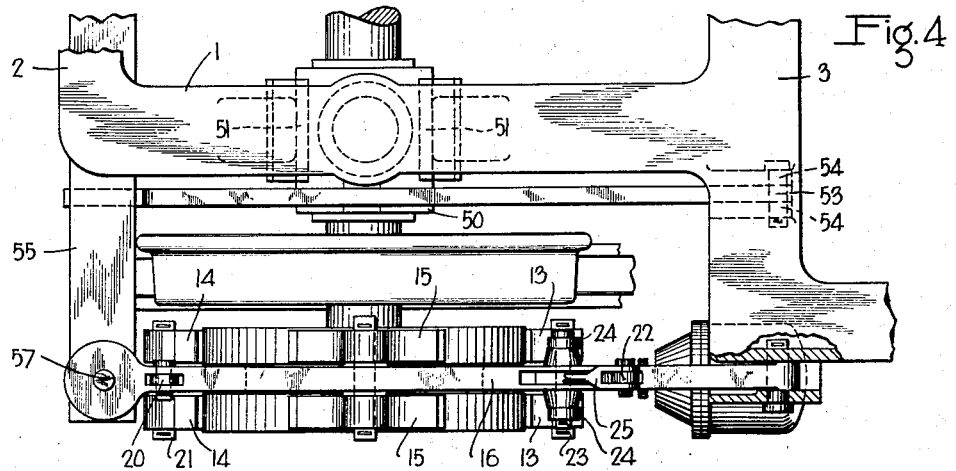
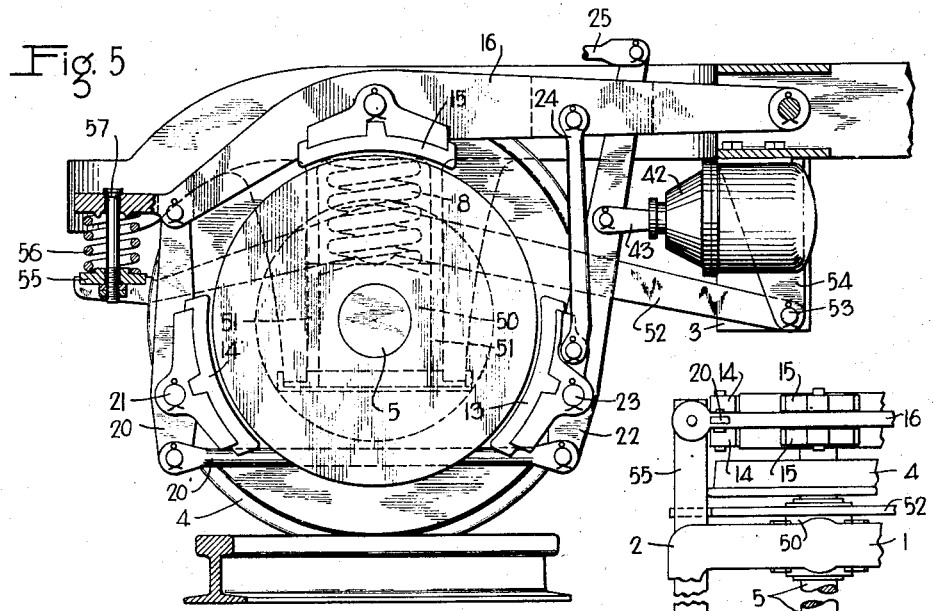
INVENTOR
CLYDE C. FARMER
BY
ATTORNEY Patented Aug. 20, 1940

2,211,916

UNITED STATES PATENT OFFICE 2,211,916

BRAKE MECHANISM

Clyde C. Farmer, Pittsburgh, Pa., assignor to The Westinghouse Air Brake Company, Wilmerding, Pa., a corporation of Pennsylvania Application April 29, 1939, Serial No. 270,777

15 Claims. (Cl. 188—190)

This invention relates to brake mechanisms for railway vehicle trucks and more particularly to that type of brake mechanism disclosed in a prior pending application of Carlton D. Stewart for U. S. Letters Patent, Serial No. 257,129, filed February 18, 1939, in which there is a brake carrier pivotally mounted on the frame of the truck for vertical movement relative thereto, and which normally supports clasp arranged brake elements movable into and out of braking engagement with the wheel and axle assembly by brake rigging which the brake carrier also supports, the clasp arranged brake elements when in engagement with the assembly acting to actuate the brake carrier or a third brake element carried thereby into supporting and braking engagement with the assembly. This brake mechanism also comprises apparatus which when the brakes are released functions to prevent the brake carrier or brake element carried thereby from engaging the assembly when, due to the usual service shocks to which the truck may be subjected, the truck frame is caused to move vertically relative to the assembly.

The apparatus for preventing unwanted engagement of the carrier with the assembly may be employed in any brake mechanism of the type in which a brake carrier is used for supporting the brake elements and the rigging for actuating them, but is especially useful in conjunction with modern car truck constructions where the truck frame supporting springs are, for the sake of easier riding, designed to permit greater vertical movement of the truck frame relative to the wheel and axle assembly than heretofore. Obviously this new spring arrangement will due to the increased deflection thereof, necessitate the spacing of the friction brake element carried by the brake carrier a greater distance from the friction braking surface of the wheel and axle assembly than with the older spring arrangement in order to prevent unwanted engagement of the elements with the assembly. In some cases this spacing may be great enough to permit so much downward movement of the clasp arranged brake elements in effecting an application of the brakes as to compress the truck supporting springs and thereby render the brake mechanism impracticable to provide the desired control over the release of the brakes. In view of this the principal object of the present invention is to provide a brake mechanism of the above mentioned type with novel means whereby, while the several parts of the brake mechanism are in their release positions, the brake carrier will be maintained spaced from the wheel and axle assembly a substantially constant distance regardless of the degree of relative vertical movement between the portions of the truck frame and the wheel and axle assembly with which the brake mechanism is associated.

Other objects and advantages will be apparent from the following more detailed description of the invention.

In the accompanying drawings, Fig. 1 is a fragmentary plan view of a portion of a railway vehicle truck and brake mechanism embodying the invention; Fig. 2 is a longitudinal sectional view of the same taken on the line 2—2 of Fig. 1; Fig. 3 is a fragmentary plan view, on a reduced scale, of the truck and the associated parts of two brake riggings for a single wheel and axle assembly; Fig. 4 is a plan view similar to Fig. 1 but illustrating a modified form of the invention; Fig. 5 is a longitudinal sectional view of the same taken on the line 5—5 of Fig. 4 and Fig. 6 is a plan view, on a reduced scale, of a portion of the truck frame and brake mechanism illustrated in Fig. 4.

In Figs. 1 to 3 inclusive of the drawings, the invention is shown embodied in a railway vehicle truck of the type having a cast metal truck frame comprising two laterally spaced longitudinally extending side frames 1 which are integrally connected together at their ends by an end piece 2 and intermediate their ends by the usual transoms 3, only one of which transoms is shown. The truck may also comprise the usual wheel and axle assembly, each of which comprises laterally spaced wheels 4 secured in any desired manner to the usual axle 5 so as to rotate therewith.

Outboard of the wheel at each side of the truck the axle is suitably journaled in a journal box 6, loosely mounted in spaced pedestal jaws 7 depending downwardly from the adjacent side frame, and seated on the journal box and resiliently supporting the truck frame vertically is a spring 8.

Located inboard of each wheel of the wheel and axle assembly, but adjacent thereto, is an annular brake drum 12 which is secured to the axle so as to rotate therewith. Each brake drum is provided with laterally spaced outer peripheral braking surfaces which are adapted to be frictionally engaged by brake elements 13, 14 and 15 which are radially arranged in pairs about the drum, the elements 13 and 14 being located below the horizontal center line of the drum and at opposite sides thereof and the elements 15 being located above the drum on substantially the vertical center line thereof. It will here be understood that each brake element may comprise the usual brake shoe and brake shoe head and since this construction of head and shoe is well known the elements will, for simplification, be hereinafter referred to by the term brake shoe or brake shoes.

It will here be understood that there will be two brake drums secured to each axle and that there will be a separate brake mechanism for cooperation with each drum.

The brake shoes 15 for each drum are pivotally carried by a combined lever and brake rigging supporting member 16 which extends longitudinally of the truck at the inner side of the adjacent side frame 1 and above the brake drum, the brake shoes being arranged one on each side of the member and being operatively connected to the members by means of a transversely extending pin 17. For the sake of simplicity this member 16 will be hereinafter referred to by the term brake carrier. The inner end of each brake carrier 16 is pivotally connected to a pair of laterally spaced lugs 18 which extend upwardly from and are carried by the adjacent transom 3 of the truck frame by means of a transversely extending pin 19 which is mounted in the lugs.

The outer end of the carrier 16 terminates short of the adjacent end piece 2 of the truck frame and pivotally connected thereto is the upper end of a hanger lever 20, to which lever the brake shoes 14 are operatively connected by means of a pin 21, the brake shoes being arranged one on each side of the lever. The lower end of lever 20 is operatively connected through the medium of a longitudinally extending connecting rod 20' to the lower end of a vertically disposed live brake cylinder lever 22 to which the brake shoes 13 are operatively connected by means of a pin 23, the brake shoes being arranged one on each side of the lever. The brake shoes 13 are supported from the brake carrier 16 by laterally spaced hangers 24 which hangers act through the medium of the brake shoes and the pin 23 to support the brake cylinder lever 22 from the brake carrier. The upper end of the brake cylinder lever extends through an opening in the brake carrier 16 and has operatively connected thereto one end of a pull rod 25 which is adapted to be actuated through the medium of the usual manually operable brake mast, not shown.

Located above the brake carrier 16 and disposed in the same vertical plane is a longitudinally extending lever 26 which, intermediate its ends, is rockably mounted on a transversely extending pin 27 mounted in laterally spaced lugs 28 which are carried by and extend upwardly from the adjacent end piece 2 of the truck frame. The inner end of this lever is operatively connected to the brake carrier 16 by means of a vertically disposed link 29, which link in the present embodiment of the invention is located on the vertical center line of the brake drum. The outer end of the lever extends beyond the end piece 2 of the truck frame and is operatively connected to the upper end of a vertically disposed rod 30 which rod at its lower end is provided with a nut 31 which supports a spring seat 32 upon which rests the lower end of a spring 33. Located below the end piece of the truck frame and resting on the upper end of the spring 33 is a transversely extending beam 34. The rod 30 extends through an opening in the beam and above the beam is provided with a nut 35 which normally engages the upper surface of the beam and maintains the beam against upward movement relative to the rod. The nuts 31 and 35 are held against accidental turning by check nuts 36 and 37, respectively.

Located between each wheel 4 and the adjacent side frame 1 is a longitudinally extending lever 38 which is rockably mounted on a pin 39 carried by laterally spaced lugs 40 carried by and depending downwardly from the end piece 2 of the truck frame. The inner end of this lever rests on the top of the adjacent journal box 6 and the outer end rests on the transversely extending beam 34. It will here be understood that at each side of the truck the outer end of the brake carrier 16 is supported from the wheel and axle assembly through the medium of the link 29, lever 26, rod 30, nut 31, spring seat 32, spring 33, beam 34, lever 38 and journal box 6.

The brake cylinder lever 22 is adapted to be operated by a brake cylinder device 42 which is located below the brake carrier 16 and which is secured to the spaced lugs 18 carried by the transom 3. This device may be of the usual construction having a push rod 43 operatively connected to the brake cylinder lever 22.

When, with the brake shoes 13, 14 and 15 in their release position, the truck frame moves vertically relative to the wheel and axle assembly in response to the usual service shocks to which the truck may be subjected, the pins 27 and 39 carried by the truck frame will cause the lever 38 to rock about its pivotal support on the journal box 6 in a counterclockwise direction.

The levers 26 and 38 are so proportioned that as the outer end of the lever 38 moves in the counterclockwise direction it acts through the medium of the beam 34, spring 33, spring seat 32, nut 31 and rod 30 to move the outer end of the lever 26 downwardly substantially the same distance as the pin 27 moves with the truck frame. From this it will be seen that the inner end of the lever 38 will not be moved, consequently the inner end of the carrier will be supported in the position in which it is shown in Fig. 2.

If the truck frame should move upwardly relative to the wheel and axle assembly the lever 38 will be rocked in a clockwise direction about its pivotal connection with the journal box 6 and the outer end of the lever acting through the medium of the beam 34, nut 35 and rod 30 will move the outer end of the lever 26 upwardly substantially the same distance as the pin 27 moves upwardly with the truck frame so that the inner end of the lever 26 will not move and the brake carrier will therefore be supported in the position in which it is shown in Fig. 2.

From the above it will be apparent that vertical vacillations of the truck frame relative to the wheel and axle assembly will not be permitted to vary the position of the brake carrier 16 relative to the brake drum.

Application of the brakes

When it is desired to effect an application of the brakes, fluid under pressure is admitted to the brake cylinder device 42 causing such device to operate to actuate the brake cylinder lever 22 in a direction toward the brake drum so as to move the brake shoes 13 into engagement with the drum. When such engagement occurs the continued movement of the lever causes the connecting rod 20' and lower end of the hanger lever 20 to be moved toward the right so as to bring the brake shoes 14 into engagement with the drum. Now as the force exerted on the brake shoes 13 and 14 is increased through the medium of the levers 22 and 20 the shoes move downwardly toward each other about the drum and act through the medium of the lever 20 and hangers 24 to move the brake carrier 16 downwardly so as to bring the brake shoes 15 into engagement with the drum.

The brake carrier as it is thus moved acts through the medium of the link 29 to rock the lever 26 in a clockwise direction about its pivot pin 27 and thereby causing the rod 30 to be moved upwardly against the opposing pressure of the spring 33 seated on the spring seat 32, the levers 38 maintaining the beam 34 stationary.

To effect the release of the brakes fluid under pressure is vented from the brake cylinder device permitting the several parts of the device to move to their release positions and permitting the brake shoes to be moved away from the brake drums by the force of gravity. As the brake shoes are thus moved the spring 33 acts on the rod 30 and thereby the outer end of the lever 26 to actuate the lever to raise the brake carrier and thereby the brake shoes out of engagement with the brake drum.

*Description of Figs. 4 to 6*

In Figs. 4 to 6 inclusive a modified form of my invention is shown embodied in a truck of the type having the wheels and axle assemblies, brake drums and brake riggings arranged outboard of the truck side frames, which side frames are recessed for the accommodation of the wheels 4 and brake parts. In this embodiment of the invention the inner end of each of the brake carriers, instead of being pivotally connected to a transom 3 as in the embodiment shown in Figs. 1 to 3, is pivotally connected to the truck side frame. Each of the axles is shown journaled adjacent each wheel and at the inner side thereof in a journal box 50 loosely mounted between spaced pedestal jaws 51 depending from the adjacent truck side frame.

With the exception of the mechanism for maintaining the brake carrier 16 against accidental movement toward the brake drum 12 the brake rigging may be identical with the rigging shown in Figs. 1 to 3, inclusive, and for this reason the following description will be more or less limited to this mechanism, it being deemed unnecessary to repeat the detailed description of the rigging.

The mechanism for maintaining the brake carrier 16 properly positioned comprises a pair of laterally spaced longitudinally extending levers 52 which in the present embodiment of the invention are arranged one between each wheel 4 and the adjacent truck side frame.

Each lever 52 extends from the end of the truck across the axle 5 and terminates in the vicinity of the transom 3 and at its inner end is pivotally connected by means of a pin 53 to laterally spaced lugs 54 which depend downwardly from the truck frame and which may be formed integral therewith. Directly above the axis of the axle these levers are rockably supported on the journal boxes 50 and at their outer ends support a laterally extending beam 55 which corresponds to the beam 34 embodied in the mechanism shown in Figs. 1 to 3, inclusive.

Interposed between and operatively engaging the outer end of each brake carrier 16 and the beam 55 is a release spring 56 which is sufficiently heavy to normally support the brake carrier and the brake rigging carried thereby as shown.

Extending between and loosely mounted in the outer ends of each carrier 16 and the adjacent lever 52 is a vertically disposed bolt 57 which passes centrally through the spring 56 and which is provided for the purpose of insuring against loss of the spring.

In operation when the truck frame moves downwardly relative to the wheel and axle assembly, the inner end of the lever 52, since it is connected to the truck frame, is caused to move in the same direction. Since the lever is rockably mounted intermediate its ends on the journal box 6 the outer end will move upwardly carrying with it the beam 55, spring 56 and outer end of the brake carrier 16. The arms of the lever are so proportioned that this upward movement of the outer end of the brake carrier will compensate for the downward movement of the pivoted inner end of the carrier and thereby prevent the brake shoes 15 from accidentally engaging the brake drum.

When an application of the brakes is being effected the brake carriers 16 as they are moved downwardly by the downwardly directed forces transmitted thereto by the action of the brake shoes 13 and 14 compresses the spring 56 until such time as the brake shoes 15 engage the brake drum, the spring being rigidly supported against downward movement by the beam 55 and levers 52.

In releasing the brakes the springs 56 act to raise the brake carriers 16 and thereby the brake shoes 15 out of engagement with the brake drum to their proper release position.

While two illustrative embodiments of the invention have been described in detail, it is not my intention to limit its scope to these embodiments or otherwise than by the terms of the appended claims.

Having now described my invention, what I claim as new and desire to secure by Letters Patent, is:

1. In a brake mechanism for a railway vehicle truck of the type comprising a wheel and axle assembly and a truck frame which is capable of vertical movement relative to the assembly, in combination, a member carried by the truck frame and movable vertically relative thereto into and out of engagement with said assembly, and a lever rockably mounted on said wheel and axle assembly and on said truck frame and responsive to relative vertical movement between the assembly and truck frame for normally maintaining said member out of engagement with the assembly.

2. In a brake mechanism for a railway vehicle truck of the type comprising a wheel and axle assembly and a truck frame which is capable of vertical movement relative to the assembly, in combination, a member carried by the truck frame and movable vertically relative thereto into and out of engagement with said assembly, and a lever interposed between and directly engaging both the wheel and axle assembly and the truck frame and operative in response to relative movement between the assembly and truck frame for normally maintaining said member out of engagement with the assembly.

3. In a brake mechanism for a railway vehicle truck of the type comprising a wheel and axle assembly and a truck frame which is capable of vertical movement relative to the assembly, in combination, a member carried by the truck frame movable relative thereto into and out of engagement with said assembly, and a lever pivotally engaging at one end the wheel and axle assembly directly and operatively associated at its other end with said member, said lever being pivotally connected intermediate its ends to said truck frame and operative upon relative vertical movement between said wheel and axle assembly and truck frame for normally maintaining said member out of engagement with the assembly.

4. In a brake mechanism for a railway vehicle truck of the type comprising a wheel and axle assembly and a truck frame which is capable of vertical movement relative to the assembly, in combination, a member carried by the truck frame and movable relative thereto into and out of engagement with said assembly, and a lever extending longitudinally of the truck and pivotally connected intermediate its ends to said truck frame, the inner end of said lever extending within the vertical plane of the wheel and axle assembly and being rockably mounted on the assembly, and the outer end of said lever being located outside of the vertical plane of the assembly and being operatively connected to said member, said lever being responsive to relative vertical movement between the wheel and axle assembly and truck frame for normally maintaining said member out of engagement with the assembly.

5. In a brake mechanism for a railway vehicle truck of the type comprising a wheel and axle assembly and a truck frame which is capable of vertical movement relative to the assembly, in combination, a member carried by the truck frame and movable vertically relative thereto into and out of engagement with said assembly, and a lever located between a wheel of the wheel and axle assembly and the adjacent side frame of the truck and rockably mounted on the assembly and on said truck frame, said lever being operatively connected to said member and being operative in response to relative vertical movement between the wheel and axle assembly and the truck frame for normally maintaining said member out of engagement with the assembly.

6. In a brake mechanism for a railway vehicle truck of the type comprising a wheel and axle assembly and a truck frame which is capable of vertical movement relative to the assembly, in combination, a member carried by the truck frame and movable vertically relative thereto into and out of engagement with said assembly, and a lever pivotally connected at one end to the truck frame and at the opposite end to said member, said lever being rockably mounted intermediate its ends on said wheel and axle assembly and being operative in response to relative vertical movement between the assembly and truck frame for normally maintaining said element out of engagement with the assembly.

7. In a brake mechanism for a railway vehicle truck of the type comprising a wheel and axle assembly and a truck frame which is capable of vertical movement relative to the assembly, in combination, two members carried by the truck frame and movable relative thereto into and out of engagement with said wheel and axle assembly, said members being arranged one adjacent each wheel of the assembly, two levers rockably associated with the assembly and truck frame and operative in response to relative vertical movement between the assembly and truck frame for normally maintaining said members out of engagement with the assembly, said levers being arranged one adjacent each of said members, and means extending transversely of the truck operatively connecting said levers to said members.

8. In a brake mechanism for a railway vehicle truck of the type comprising a wheel and axle assembly and a truck frame which is capable of vertical movement relative to the assembly, in combination, two members carried by the truck frame and movable relative thereto into and out of engagement with said wheel and axle assembly, said members being arranged one adjacent each wheel of the assembly, two levers rockably associated with the assembly and truck frame and operative in response to relative vertical movement between the assembly and truck frame for normally maintaining said members out of engagement with the assembly, said levers being arranged one adjacent each member but laterally spaced away from the members, and a beam extending laterally of the truck operatively connecting said levers and members.

9. In a brake mechanism for a railway vehicle truck of the type comprising a wheel and axle assembly and a truck frame which is capable of vertical movement relative to the assembly, in combination, two members carried by the truck frame and movable relative thereto into and out of engagement with said wheel and axle assembly, said members being arranged one adjacent each wheel of the assembly, two levers rockably associated with the assembly and truck frame and operative in response to relative vertical movement between the assembly and truck frame for normally maintaining said members out of engagement with the assembly, said levers being arranged one adjacent each of said members, means extending transversely of truck operatively connecting said levers to said members, and means interposed between said beam and members normally constituting supporting connection between the beam and members, said means being adapted to yield to intentional movement of the members relative to the truck frame in the direction to engage said assembly.

10. In a brake mechanism for a railway vehicle truck of the type comprising a wheel and axle assembly and a truck frame which is capable of vertical movement relative to the assembly, in combination, two members carried by the truck frame and movable relative thereto into and out of engagement with said wheel and axle assembly, said members being arranged one adjacent each wheel of the assembly, two levers rockably associated with the assembly and truck frame and operative in response to relative vertical movement between the assembly and truck frame for normally maintaining said members out of engagement with the assembly, said levers being arranged one adjacent each of said members, means extending transversely of the truck operatively connecting said levers to said members, and means interposed between said beam and members normally constituting the supporting connection between the beam and members, said means being adapted to yield to intentional movement of the members relative to the truck frame in a direction for engagement with the assembly, and being adapted to subsequently move said members out of engagement with the assembly.

11. In a brake mechanism for a railway vehicle truck of the type comprising a wheel and axle assembly and a truck frame which is capable of vertical movement relative to the assembly, in combination, a member carried by the truck frame and movable relative thereto into and out of engagement with said assembly, and lever means cooperating with said wheel and axle assembly and truck frame for normally maintaining said member out of engagement with the assembly, said lever means comprising a lever pivotally mounted on the truck frame and having a supporting connection with said member, another lever pivotally mounted on the truck frame and on said wheel and axle assembly, and means operatively connecting said levers together, said levers and means being so arranged with relation to each other and the truck frame and member as to respond to relative vertical movement between the assembly and truck frame to maintain the member out of unwanted engagement with the assembly.

12. In a brake mechanism for a railway vehicle truck of the type comprising a wheel and axle assembly and a truck frame which is capable of vertical movement relative to the assembly, in combination, a member carried by the truck frame movable relative thereto into and out of engagement with said assembly, and lever means cooperating with said wheel and axle assembly and truck frame for normally maintaining said member out of engagement with the assembly, said lever means comprising a lever pivotally mounted on the truck frame and having a supporting connection with said member, another lever pivotally mounted on the truck frame and on said wheel and axle assembly, and means operatively connecting said levers together, said levers and means being so arranged with relation to each other and to the truck frame and member as to respond to relative vertical movement between the assembly and truck frame to maintain the member out of unwanted engagement with the assembly and said means being yieldable to movement of the first mentioned lever relative to said other lever in response to intentional movement of the lever in the direction to engage the assembly.

13. In a brake mechanism for a railway vehicle truck of the type comprising a wheel and axle assembly and a truck frame which is capable of vertical movement relative to the assembly, in combination, a member carried by the truck frame and movable relative thereto into and out of engagement with said assembly, and lever means cooperating with said wheel and axle assembly and truck frame for normally maintaining said member out of engagement with the assembly, said lever means comprising a lever pivotally mounted on the truck frame and having a supporting connection with said member, another lever pivotally mounted on the truck frame and on said wheel and axle assembly, and means operatively connecting said levers together, said levers and means being so arranged with relation to each other and to the truck frame and member as to respond to relative vertical movement between the assembly and truck frame to maintain the member out of unwanted engagement with the assembly, said means comprising adjusting mechanism operative to actuate the first mentioned lever to adjust said member vertically relative to said wheel and axle assembly and to said other lever.

14. In a brake mechanism for a railway vehicle truck of the type comprising a wheel and axle assembly and a truck frame which is capable of vertical movement relative to the assembly, in combination, a member carried by the truck frame and movable relative thereto into and out of enegagement with said assembly, and lever means cooperating with said wheel and axle assembly and truck frame for normally maintaining said member out of engagement with the assembly, said lever means comprising a lever pivotally mounted on the truck frame and having a supporting connection with said member, another lever pivotally mounted on the truck frame and on said wheel and axle assembly, and means operatively connecting said levers together, said levers and means being so arranged with relation to each other and to the truck frame and member as to respond to relative vertical movement between the assembly and truck frame to maintain the member out of unwanted engagement with the assembly, said means comprising adjusting mechanism operative to actuate the first mentioned lever to adjust said member vertically relative to said wheel and axle assembly and to said other lever, said means comprising adjusting mechanism cooperating with said other lever and operative to actuate the first mentioned lever to adjust said member vertically relative to said wheel and axle assembly.

15. In a railway vehicle truck brake rigging of the type comprising clasp arranged brake elements movable into braking engagement with a wheel and axle assembly of the truck, a brake carrier pivotally connected at one end to the frame of the truck and movable vertically relative to the frame into engagement with the wheel and axle assembly, said truck frame being capable of vertical movement relative to the wheel and axle assembly, in combination, lever means rockably mounted on said wheel and axle assembly and truck frame and operative in response to relative vertical movement between said truck frame and wheel and axle assembly for normally maintaining said member out of engagement with said assembly.

CLYDE C. FARMER.